(12) United States Patent
Ijeri et al.

(10) Patent No.: US 10,428,226 B2
(45) Date of Patent: Oct. 1, 2019

(54) SOL-GEL COATING COMPOSITIONS AND RELATED PROCESSES

(71) Applicant: The Boeing Company, Chicago, IL (US)

(72) Inventors: Vijaykumar S. Ijeri, Bangalore (IN); Om Prakash, Bangalore (IN); Stephen P. Gaydos, St. Louis, MO (US); Raghavan Subasri, Hyderabad (IN); Kalidindi Ramachandra Soma Raju, Hyderabad (IN); Dendi Sreenivas Reddy, Hyderabad (IN)

(73) Assignee: The Boeing Company, Chicago, IL (US)

( * ) Notice: Subject to any disclaimer, the term of this patent is extended or adjusted under 35 U.S.C. 154(b) by 136 days.

(21) Appl. No.: 15/231,617

(22) Filed: Aug. 8, 2016

(65) Prior Publication Data
US 2018/0022936 A1  Jan. 25, 2018

Related U.S. Application Data

(60) Provisional application No. 62/364,636, filed on Jul. 20, 2016.

(51) Int. Cl.
| | |
|---|---|
| *C09D 5/08* | (2006.01) |
| *C23C 18/12* | (2006.01) |
| *C08G 77/58* | (2006.01) |
| *C09D 183/14* | (2006.01) |
| *B05D 3/06* | (2006.01) |
| *B05D 7/14* | (2006.01) |
| *B05D 3/02* | (2006.01) |
| *B05D 7/00* | (2006.01) |

(52) U.S. Cl.
CPC ............ *C09D 5/086* (2013.01); *C08G 77/58* (2013.01); *C09D 5/08* (2013.01); *C09D 183/14* (2013.01); *C23C 18/122* (2013.01); *C23C 18/1225* (2013.01); *C23C 18/1241* (2013.01); *C23C 18/1254* (2013.01); *B05D 3/0254* (2013.01); *B05D 3/067* (2013.01); *B05D 7/14* (2013.01); *B05D 7/572* (2013.01); *B05D 7/576* (2013.01); *B05D 2202/25* (2013.01); *B05D 2518/12* (2013.01)

(58) Field of Classification Search
CPC ... C23C 18/1254; C23C 18/122; C08G 77/14; C08G 77/20
See application file for complete search history.

(56) References Cited

U.S. PATENT DOCUMENTS

| | | | | |
|---|---|---|---|---|
| 4,753,827 A * | 6/1988 | Yoldas | ................. | C09D 183/04 427/387 |
| 4,754,012 A * | 6/1988 | Yoldas | ................. | C09D 183/04 427/387 |
| 4,814,017 A * | 3/1989 | Yoldas | ................. | C09D 183/04 106/287.12 |
| 5,328,975 A * | 7/1994 | Hanson | ................ | C09D 183/14 427/372.2 |
| 5,939,197 A * | 8/1999 | Blohowiak | .............. | C09D 5/08 428/413 |
| 5,958,578 A | 9/1999 | Blohowiak et al. | | |
| 6,037,060 A | 3/2000 | Blohowiak et al. | | |
| 6,077,885 A | 6/2000 | Hager et al. | | |
| 6,150,033 A | 11/2000 | Mosser et al. | | |
| 6,169,119 B1 * | 1/2001 | Ryang | ...................... | C08F 2/44 423/DIG. 14 |
| 6,579,472 B2 | 6/2003 | Chung et al. | | |
| 6,605,365 B1 * | 8/2003 | Krienke | ................. | B05D 3/102 428/328 |
| 7,052,592 B2 | 5/2006 | Edigaryan | | |
| 8,592,042 B2 | 11/2013 | Blohowiak et al. | | |
| 2001/0047665 A1 * | 12/2001 | Zhang | ..................... | C03C 1/006 65/17.2 |
| 2002/0165339 A1 * | 11/2002 | Zha | ........................ | C08G 77/56 528/394 |
| 2003/0024432 A1 * | 2/2003 | Chung | ..................... | C09D 1/00 106/14.12 |

(Continued)

FOREIGN PATENT DOCUMENTS

| | | |
|---|---|---|
| DE | 19718891 | 11/1998 |
| DE | 102009001372 | 9/2010 |

(Continued)

OTHER PUBLICATIONS

Versace et al. (New J. Chem. 2008, 32, 2270-2278) (Year: 2008).*
Yasakau et al., "Active Corrosion Protection by Nanoparticles and Conversion Films of Layered Double Hydroxides," Proceedings of the CORROSION 2013 Research Topical Symposium: Functionalized Coatings for Durable Materials and Interfaces, May 2014, pp. 436-445, vol. 70—No. 5, NACE International, Houston, Texas, USA.
Yasakau et al., "Mechanism of Corrosion Inhibition of AA2024 by Rare-Earth Compounds," Journal of Physical Chemistry B, Feb. 17, 2006, pp. 5515-5528, vol. 110—No. 11, American Chemical Society, Washington, DC, USA.

(Continued)

*Primary Examiner* — Liam J Heincer
(74) *Attorney, Agent, or Firm* — Haynes and Boone, LLP

(57) ABSTRACT

An alkoxysilane is contacted with water and an inorganic acid to form a first composition. A zirconium alkoxide is contacted with an organic acid to form a second composition. One or more alkoxysilanes and an organic acid are contacted with a mixture of the first and second compositions to form a sol-gel composition, to which a photoinitiator is added. The sol-gel composition has a ratio of a number of moles of silicon to a number of moles of zirconium ($n_{Si}/n_{Zr}$) ranging from about 2 to about 10. The sol-gel composition is applied on a substrate (e.g., an aluminum alloy substrate) multiple times to form multiple sol-gel layers, and at least one of the sol-gel layers is cured by UV radiation. The multiple sol-gel layers are then thermally cured.

19 Claims, 4 Drawing Sheets

(56) References Cited

U.S. PATENT DOCUMENTS

| | | | |
|---|---|---|---|
| 2003/0144469 A1* | 7/2003 | Kauffman | C08J 7/045 528/480 |
| 2004/0024835 A1 | 2/2004 | Howard | |
| 2004/0107989 A1* | 6/2004 | Woll | H01L 31/02167 136/256 |
| 2005/0048298 A1 | 3/2005 | Howell et al. | |
| 2006/0009536 A1* | 1/2006 | Jang | C03C 1/006 516/100 |
| 2006/0230476 A1* | 10/2006 | Atanasoska | A61L 29/12 604/93.01 |
| 2007/0125451 A1 | 6/2007 | Smith et al. | |
| 2008/0058489 A1* | 3/2008 | Edelmann | B22C 1/183 528/9 |
| 2008/0111027 A1* | 5/2008 | Blohowiak | C09D 4/00 244/133 |
| 2008/0245260 A1* | 10/2008 | Campazzi | B82Y 30/00 106/14.41 |
| 2009/0078153 A1 | 3/2009 | Shchukin et al. | |
| 2009/0104362 A1* | 4/2009 | Jang | C03B 19/1065 427/384 |
| 2009/0148711 A1* | 6/2009 | Le Blanc | C08G 77/58 428/447 |
| 2009/0186053 A1* | 7/2009 | Meyer | A61K 8/11 424/401 |
| 2009/0192251 A1 | 7/2009 | Chung et al. | |
| 2010/0316447 A1* | 12/2010 | Schmidt | C04B 12/04 405/128.75 |
| 2010/0330380 A1 | 12/2010 | Colreavy et al. | |
| 2011/0207049 A1* | 8/2011 | Tillema | C08G 77/14 430/270.1 |
| 2011/0207206 A1* | 8/2011 | Shelekhov | C08G 77/58 435/287.1 |
| 2012/0298923 A1* | 11/2012 | Lee | C09D 5/103 252/389.32 |
| 2013/0034702 A1* | 2/2013 | Bockmeyer | B29D 11/00365 428/172 |
| 2013/0145957 A1 | 6/2013 | Shchukin et al. | |
| 2014/0322540 A1* | 10/2014 | Ferguson | B64F 5/40 428/416 |
| 2015/0079298 A1 | 3/2015 | Ferreira et al. | |
| 2015/0125690 A1* | 5/2015 | Ryu | G06F 3/041 428/336 |
| 2015/0337171 A1* | 11/2015 | Melzer | C23C 18/122 156/278 |
| 2015/0376420 A1 | 12/2015 | Hintze-Bruning et al. | |
| 2016/0089334 A1* | 3/2016 | Nakayama | C09D 11/00 424/489 |
| 2017/0009034 A1* | 1/2017 | Suzuki | C08J 7/045 |
| 2017/0020331 A1* | 1/2017 | Berrux | A47J 36/02 |
| 2018/0022937 A1* | 1/2018 | Ijeri | B05D 1/02 |
| 2018/0022938 A1* | 1/2018 | Ijeri | B05D 3/06 |

FOREIGN PATENT DOCUMENTS

| | | |
|---|---|---|
| EP | 0263428 | 4/1988 |
| EP | 2011899 | 1/2009 |
| EP | 2743377 | 6/2014 |
| IE | 20080941 | 9/2009 |
| WO | WO 2004/024835 | 3/2004 |

OTHER PUBLICATIONS

Poznyak et al., "Novel Inorganic Host Layered Double Hydroxides Intercalated with Guest Organic Inhibitors for Anticorrosion Applications," Applied Materials & Interfaces, Oct. 12, 2009, pp. 2353-2362, vol. 1—No. 10, American Chemical Society, Washington, DC, USA.

Wang et al., "A room temperature cured sol-gel anticorrosion pre-treatment for Al 2024-T3 alloys," Corrosion Science, Dec. 2007, pp. 4491-4503, vol. 49—No. 12, Elsevier Ltd., London, England.

Zhong et al., "Self-repairing vanadium-zirconium composite conversion coating for aluminum alloys," Applied Surface Science, Sep. 1, 2013, pp. 489-493, vol. 280, Elsevier B.V., Amsterdam, Netherlands.

Zheludkevich et al., "Active protection coatings with layered double hydroxide nanocontainers of corrosion inhibitor", Feb. 1, 2010, pp. 602-611, vol. 52, No. 2, Corrosion Science, Oxford, GB.

Alibakhshi et al., "Fabrication and Characterization of $PO_4^{3-}$ Intercalated Zn-Al-Layered Double Hydroxide Nanocontainer", Jan. 1, 2016, pp. C495-C505, vol. 163, No. 8, Journal of the Electrochemical Society, Pennington, New Jersey.

Shkirskiy et al., "Factors Affecting $MoO_4^{2-}$ Inhibitor Release from $Zn_2Al$ Based Layered Double Hydroxide and Their Implication in Protecting Hot Dip Galvanized Steel by Means of Organic Coatings", Nov. 3, 2015, pp. 25180-25192, vol. 7, No. 45, ACS Applied Materials & Interfaces, Washington, D.C.

"Addressing Chemicals of Concern," European Chemicals Agency (ECHA), retrieved at http://echa.europa.eu/addressing-chemicals-of-concern, Jun. 22, 2012, 1 page.

"Authorisation List," European Chemicals Agency (ECHA), retrieved at http://echa.europa.eu/addressing-chemicals-of-concern/authorisation/recommendation-for-inclusion-in-the-authorisation-list/authorisation-list, Jun. 23, 2012, 3 pages.

"Hexavalent Chromium," OSHA, retrieved at https://www.osha.gov/SLTC/hexavalentchromium/, Jan. 2, 2004, 2 pages.

* cited by examiner

SOL-GEL COATING COMPOSITIONS AND RELATED PROCESSES

CROSS REFERENCE TO RELATED APPLICATION

This application claims the benefit of and priority to U.S. Provisional Application No. 62/364,636, filed on Jul. 20, 2016, which is hereby incorporated by reference in its entirety.

BACKGROUND

1. Technical Field

The present disclosure relates to coating compositions and processes and, more particularly, to sol-gel coating compositions and related processes.

2. Related Art

High strength alloys such as aluminum alloys are widely used in various industries such as the aerospace industry due to their high strength to weight ratio. However these alloys are prone to corrosion due to the presence of alloying materials.

In order to protect these alloys from the environment, a chrome conversion coating may be provided on a surface of an alloy followed by application of primer and a top coat. Although organic paint systems applied on the surface provide good barrier properties against corrosion, even small defects formed in the organic paint ensure pathways for the ingress of electrolyte to the metallic surface, which initiates localized corrosion. Therefore, chromium based conversion coatings have been used in anti-corrosion pre-treatments before application of organic coatings. However, hexavalent chromium compounds have harmful effects.

Thus, there is a need for coating compositions and processes that are chromium-free and provide a coating that is corrosion-resistant.

SUMMARY

In accordance with embodiments of the present disclosure, various methods and formulations are provided relating to sol-gel coating of substrates such as an aluminum substrate, an aluminum alloy substrate (e.g., AA 2024, AA 6061, or AA 7075), or other substrate. The sol-gel coating provided on a substrate advantageously provides corrosion protection. Further, the sol-gel coating provided on the substrate advantageously provides enhanced adhesion between the substrate and a paint system (e.g., primer and paint).

In one exemplary aspect, a method for preparing a sol-gel composition includes contacting a first alkoxysilane with water and an inorganic acid to form a first composition, contacting a zirconium alkoxide with a first organic acid to form a second composition, contacting the first composition with the second composition to form a mixture, contacting one or more second alkoxysilanes and a second organic acid with the mixture to form the sol-gel composition that has a ratio of a number of moles of silicon to a number of moles of zirconium ($n_{Si}/n_{Zr}$) ranging from about 2 to about 10, and adding a photoinitiator to the sol-gel composition. The method may also include diluting the sol-gel composition with a solvent and stirring.

In an additional exemplary aspect, a method for providing a corrosion-resistant coating on a substrate (e.g., an aluminum substrate, an aluminum alloy substrate, or other substrate) includes forming a plurality of sol-gel layers on the substrate using the sol-gel composition to provide the corrosion-resistant coating. The method may further include contacting the sol-gel composition with the substrate for each sol-gel layer, curing at least one of the multiple sol-gel layers by UV radiation, and thermally curing the multiple sol-gel layers.

In another exemplary aspect, a sol-gel composition and/or a corrosion resistant coating including multiple sol-gel layers is provided by one of the methods described above.

In a further exemplary aspect, a corrosion resistant coated product includes a plurality of UV-cured sol-gel layers on a substrate, each of the UV-cured sol-gel layers including a photoinitiator and a polymer composite of one or more alkoxysilanes, a zirconium alkoxide, and an organic acid, and each of the UV-cured sol-gel layers having a ratio of a number of moles of silicon to a number of moles of zirconium ($n_{Si}/n_{Zr}$) ranging from about 2 to about 10.

The scope of the invention is defined by the claims, which are incorporated into this section by reference. A better understanding of the methods and formulations for sol-gel coating of the present disclosure, as well as an appreciation of the above and additional advantages thereof, will be afforded to those of skill in the art by a consideration of the following detailed description of one or more example embodiments thereof. In this description, reference is made to the various views of the appended sheets of drawings, which are briefly described below, and within which, like reference numerals are used to identify like ones of the elements illustrated therein.

DETAILED DESCRIPTION

Figure 1:
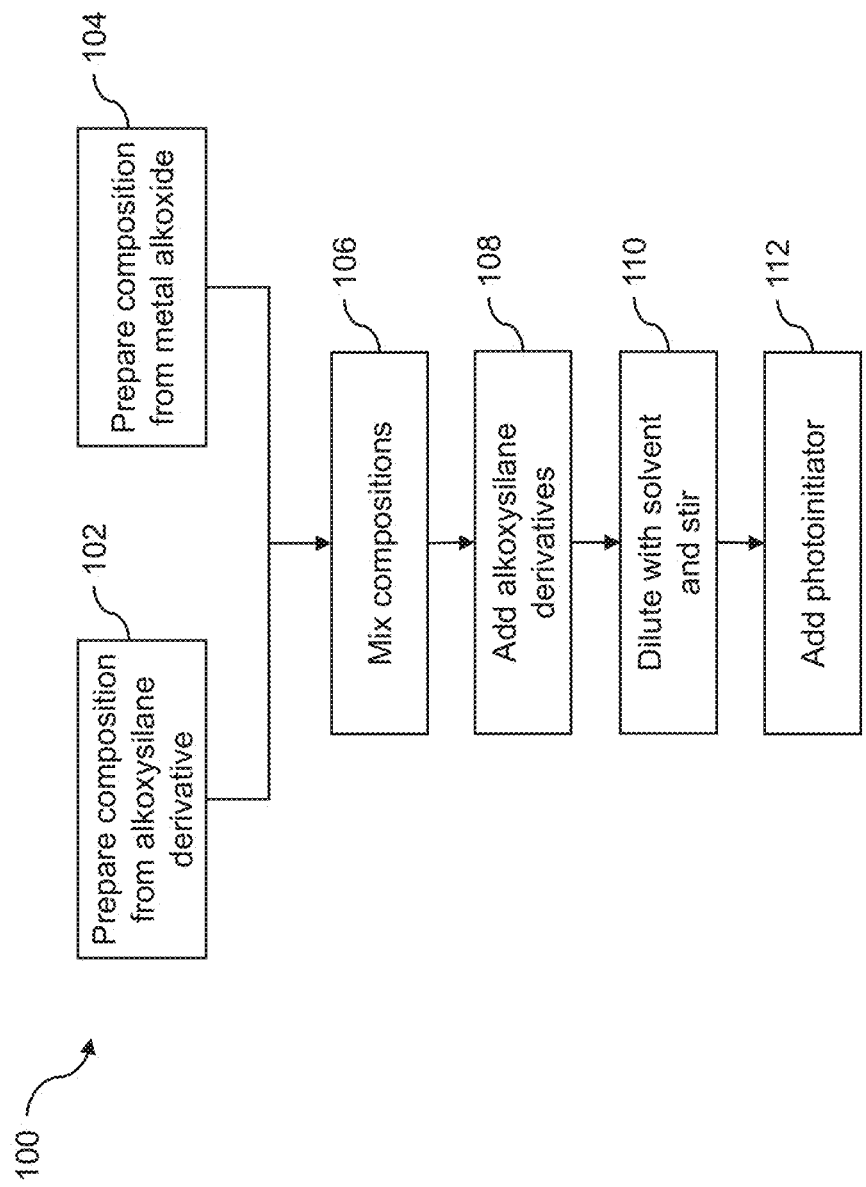
FIG. 1 illustrates an example process for preparing a sol-gel composition in accordance with an embodiment of the present disclosure.

The following description is merely exemplary in nature and is not intended to limit the present disclosure, application, or uses.

The terms "substituent", "radical", "group", "moiety," and "fragment" may be used interchangeably.

Singular forms "a" and "an" may include plural reference unless the context clearly dictates otherwise.

The number of carbon atoms in a substituent can be indicated by the prefix "$C_{A-B}$" where A is the minimum and B is the maximum number of carbon atoms in the substituent.

The term "alkyl" embraces a linear or branched acyclic alkyl radical containing from 1 to about 15 carbon atoms. In some embodiments, alkyl is a $C_{1-10}$ alkyl, $C_{1-6}$ alkyl, or $C_{1-3}$ alkyl radical. Examples of alkyl include, but are not limited to, methyl, ethyl, propyl, isopropyl, butyl, isobutyl, tert-butyl, sec-butyl, pentan-3-yl (i.e.,

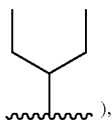

and the like.

The term "alkoxy" is RO— where R is alkyl. Non-limiting examples of alkoxy include methoxy, ethoxy, propoxy, n-butyloxy, and tert-butyloxy. The terms "alkyloxy", "alkoxy," and "alkyl-O—" may be used interchangeably.

The term "methacryl" is

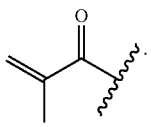

The term "methacryloxy" is

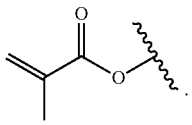

The term "methacryloxyalkyl" embraces alkyl substituted with methacryloxy. Non-limiting examples of methacryloxyalkyl include methacryloxyethyl, methacryloxypropyl, and methacryloxybutyl.

The term "glycidyl" is

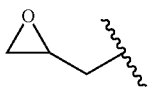

The term "glycidyloxy" is

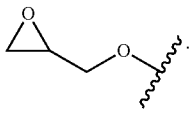 [SMILES: *OCC1CO1]

The terms "glycidyloxy" and "glycidoxy" may be used interchangeably.

The term "glycidoxyalkyl" embraces alkyl substituted with glycidoxy. Non-limiting examples of glycidoxyalkyl include, glycidoxyethyl, and glycidoxypropyl, and glycidoxybutyl. The terms "glycidyloxyalkyl" and "glycidoxyalkyl" may be used interchangeably.

The term "aminoalkyl" embraces an amino radical attached to a parent molecular scaffold through an alkyl radical (e.g., $NH_2$-alkyl-scaffold).

The term "aryl" refers to any monocyclic, bicyclic, or tricyclic cyclized carbon radical, wherein at least one ring is aromatic. An aromatic radical may be fused to a non-aromatic cycloalkyl or heterocyclyl radical. Aryl may be substituted or unsubstituted. Examples of aryl include phenyl and naphthyl.

The term "aralkyl" embraces aryl attached to a parent molecular scaffold through alkyl and may be used interchangeably with the term "arylalkyl." Examples of aralkyl include benzyl, diphenylmethyl, triphenylmethyl, phenylethyl, and diphenylethyl. The terms "benzyl" and "phenylmethyl" may be used interchangeably.

The term "silane" is a compound containing silicon.

The term "organosilane" is a silane having at least one silicon to carbon bond.

The term "alkoxysilane" is a silane having at least one silicon to alkoxy bond.

The term "organoalkoxysilane" is a silane having at least one silicon to carbon bond and at least one silicon to alkoxy bond.

The term "about," as used herein when referring to a measurable value such as an amount, concentration, time and the like, is meant to encompass variations of ±20%, ±10%, ±5%, ±1%, ±0.5%, or even ±0.1% of the specified value.

Compositions and processes relating to sol-gel coating of substrates such as metal or metal alloy substrates (e.g., aluminum substrates, aluminum alloy substrates (e.g., AA 2024, AA 6061, or AA 7075), or other substrates) are provided. Sol-gel coating may be used as a chrome-free pretreatment on substrates prior to the application of organic coatings such as primer and paint. The pretreatment may be performed by applying a layer of a sol-gel composition that is obtained as a product of hydrolysis and condensation of a mixture of organosilanes and a metal alkoxide. Ultraviolet (UV) radiation is used to densify the sol-gel layer in addition to, or instead of, thermal curing the sol-gel layer. Thermal curing may include exposing the sol-gel layer to a high temperature (e.g., in a hot air circulated oven). Alternatively, or in addition, thermal curing may include exposing the sol-gel layer to infrared (IR) radiation or near IR radiation, which reduces curing time.

FIG. 1 illustrates an example process 100 for preparing a sol-gel composition. A low temperature curable matrix sol is synthesized in two parts (Composition A and Composition B), the two parts are mixed together, and additional compounds are added and stirred to complete synthesis and obtain a sol-gel composition.

At block 102, Composition A is prepared from an alkoxysilane such as an organoalkoxysilane. An alkoxysilane is contacted with water and an inorganic acid (e.g., HCl, $HNO_3$, $H_3PO_4$, or other inorganic acid) to form Composition A.

For example, an alkoxysilane is mixed with water and stirred, and an inorganic acid is added to the solution of the alkoxysilane and water and stirred in an ice bath until the solution turns transparent. The ratio of the number of moles of the alkoxysilane (which is equal to the number of moles of silicon from the alkoxysilane) to the number of moles of water ($n_{Si}/n_{water}$) in Composition A ranges from about 0.5 to about 2. The ratio may be, for example, about 0.5, 0.6, 0.7, 0.8, 0.9, 1.0, 1.1, 1.2, 1.3, 1.4, 1.5, 1.6, 1.7, 1.8, 1.9, or 2.0, where any value may form an upper end point or a lower end point, as appropriate.

In an aspect, an alkoxysilane of Formula I is used as Precursor A:

$$R_A\text{—Si—}(R_B)_3 \quad \text{Formula I}$$

wherein;
$R_A$ is methacryloxyalkyl or glycidoxyalkyl; and
$R_B$ is alkoxy.

In another aspect, $R_A$ is methacryloxyalkyl (e.g., methacryloxymethyl, methacryloxyethyl, methacryloxypropyl, methacryloxybutyl, or other methacryloxyalkyl) or glycidoxyalkyl (e.g., glycidoxymethyl, glycidoxyethyl, glycidoxypropyl, glycidoxybutyl); and each $R_B$ is independently alkoxy (e.g., methoxy, ethoxy, propoxy).

Specific examples of $R_A\text{—Si—}(R_B)_3$ include 3-methacryloxypropyltrimethoxysilane, 3-methacryloxypropyltriethoxysilane, 3-glycidyloxypropyltrimethoxysilane, and 3-glycidoxypropylethoxysilane.

In some aspects, an alkoxysilane used as Precursor A of a sol-gel composition includes methacryloxyalkyl alkoxysilane (an alkoxysilane of Formula I in which $R_A$ is methacryloxyalkyl) and/or a glycidoxyalkyl alkoxysilane (an alkoxysilane of Formula I in which the $R_A$ is glycidoxyalkyl). The methacryloxyalkyl alkoxysilane and/or the glycidoxyalkyl alkoxysilane are used, for example, to facilitate polymerization of the sol-gel composition when exposed to UV radiation.

At block 104, Composition B is prepared from a transition metal alkoxide such as a zirconium alkoxide. A zirconium alkoxide is contacted with an organic acid such as a carboxylic acid (e.g., methacrylic acid (MAA) or other carboxylic acid) to form Composition B.

For example, the zirconium alkoxide is mixed with methacrylic acid and stirred. The ratio of the number of moles of the zirconium alkoxide (which is equal to the number of moles of zirconium from the zirconium alkoxide) to the ratio of the number of moles of methacrylic acid (($n_{Zr}/n_{MAA}$) ranges from about 0.5 to about 2. The ratio may be, for example, about 0.5, 0.6, 0.7, 0.8, 0.9, 1.0, 1.1, 1.2, 1.3, 1.4, 1.5, 1.6, 1.7, 1.8, 1.9, or 2.0, where any value may form an upper end point or a lower end point, as appropriate.

In an aspect, a zirconium alkoxide of Formula II is used as Precursor B:

$$\text{Zr—}(R_C)_4 \quad \text{Formula II}$$

wherein;
$R_C$ is alkoxy.

In another aspect, each $R_C$ is independently alkoxy (methoxy, ethoxy, n-propoxy, isopropoxy, n-butoxy, tert-butoxy, or other alkoxy).

Specific examples of $\text{Zr—}(R_C)_4$ include zirconium ethoxide, zirconium n-propoxide, zirconium isopropoxide, zirconium n-butoxide, and zirconium tert-butoxide.

In some aspects, a zirconium alkoxide is used as Precursor B of a sol-gel composition, for example, to match the coefficient of thermal expansion of the sol-gel composition with a substrate. The zirconium alkoxide may be used in an amount such that the coefficient of thermal expansion of the sol-gel composition is equal to or about the coefficient of thermal expansion of the substrate.

At block 106, Composition A and Composition B are mixed together. For example, Composition B is added to Composition A under stirring to avoid agglomeration, and the mixture of Composition A and Composition B is stirred in an ice bath and then stirred at room temperature so that the temperature of the mixture reaches room temperature.

At block 108, one or more alkoxysilanes such as one or more organoalkoxysilanes are added to the mixture of Composition A and Composition B. One or more alkoxysilanes and an organic acid such as a carboxylic acid (e.g., methacrylic acid or other carboxylic acid) are contacted with the mixture of Composition A and Composition B to form a sol-gel composition.

For example, each of one or more alkoxysilanes are added to the mixture and stirred. Then, methacrylic acid is added to the resulting mixture and stirred. Optionally, an inorganic acid is added before, together with, or after the organic acid.

In an aspect, one or more alkoxysilane of Formula III is used as Precursor C:

$$R_D\text{—Si—}(R_E)_3 \quad \text{Formula III}$$

wherein;
$R_D$ is aryl, aralkyl, glycidoxyalkyl, or aminoalkyl; and
$R_E$ is alkoxy.

In another aspect, $R_D$ is aryl (e.g., phenyl or other aryl), aralkyl (e.g., benzyl, phenylethyl, phenylpropyl, or other aralkyl), glycidoxyalkyl (e.g., glycidomethyl, glycidoxyethyl, glycidoxypropyl, glycidoxybutyl, or other glycidoxyalkyl), or aminoalkyl (e.g., aminomethyl, aminoethyl, aminopropyl, aminobutyl, or other aminoalkyl); and each $R_E$ is independently alkoxy (e.g., methoxy, ethoxy, propoxy).

Specific examples of $R_D\text{—Si—}(R_E)_3$ include phenyltrimethoxysilane, phenyltriethoxysilane, 3-glycidoxypropyltrimethoxysilane, 3-glycidoxypropyltriethoxysilane, 3-aminopropyltrimethoxysilane, and 3-aminopropyltriethoxysilane.

In some aspects, one or more alkoxysilanes used as Precursor C of a sol-gel composition include an aryl alkoxysilane (an alkoxysilane of Formula III in which $R_D$ is aryl), a glycidyloxyalkyl alkoxysilane (an alkoxysilane of Formula III in which $R_D$ is glycidoxyalkyl), and/or an aminoalkyl alkoxysilane (an alkoxysilane of Formula III in which $R_D$ is aminoalkyl). The aryl alkoxysilane is used, for example, to improve the barrier properties of a coating formed from the sol-gel composition. The glycidyloxyalkyl alkoxysilane is used, for example, to generate a thick coating. The aminoalkyl alkoxysilane is used, for example, to improve the adhesion of the sol-gel composition to a substrate when deposited.

In an example, an aryl alkoxysilane is added to the mixture and stirred. Then, an aminoalkyl alkoxysilane is added to the mixture and stirred. Then, a glycidyloxyalkyl alkoxysilane is added to the mixture. Then, methacrylic acid is added and stirred. An inorganic acid may also be added. The order of the alkoxysilanes that are added may be changed in other examples.

The total amount of the alkoxysilanes, which includes the alkoxysilane used in block 102 and the one or more alkoxysilanes used in block 108, and the amount of the zirconium alkoxide used in block 104 are such that the sol-gel composition has a ratio of a number of moles of alkoxysilanes (which is equal to the number of moles of silicon from the alkoxysilanes) to a number of moles of zirconium alkoxide (which is equal to the number of moles of zirconium from the zirconium alkoxide) ($n_{Si}/n_{Zr}$) ranging from about 2 to about 10. The ratio of the number of moles of silicon to the number of moles of zirconium ($n_{Si}/n_{Zr}$) may be about 2, 3, 4, 5, 6, 7, 8, 9, or 10, where any value may form an upper end point or a lower end point, as appropriate.

In some examples, one or more of the stirring performed in blocks 102, 104, 106, and/or 108 may be performed for a time period ranging from about 10 min to about 120 min. The stirring performed in blocks 102, 104, 106, and/or 108 may be performed for a time period of about 10, 20, 30, 40, 50, 60, 70, 80, 90, 100, 110, or 120 min, where any value may form an upper end point or a lower end point, as appropriate.

At block 110, the sol-gel composition formed by block 108 is diluted with a solvent such as alcohol (e.g., isopropanol or other solvent) and stirred. The dilution of the sol-gel composition, the stirring to age the sol-gel composition, or both (e.g., block 110 entirely) may be omitted in some embodiments.

For example, the sol-gel composition is diluted with isopropanol in a weight ratio of about 1:1. The diluted sol-gel composition, or the sol-gel composition formed by block 108 if dilution is omitted, is stirred to age the sol-gel composition for a time period ranging from 1 to about 24 hours (h). The stirring to age the sol-gel composition may be performed for a time period of about 1, 2, 3, 4, 5, 6, 9, 12, 15, 18, 21, or 24 h, where any value may form an upper end point or a lower end point, as appropriate.

At block 112, a photoinitiator is added to the sol-gel composition formed by block 110 (or by block 108 for embodiments in which block 110 is omitted) and stirred to form a sol-gel composition that includes the photoinitiator.

For example, a photoinitiator in an amount ranging from about 0.5 to about 3 parts by weight per 100 parts by weight of the sol-gel composition (the weight of the sol-gel with the photoinitiator to be added or, alternatively, the weight of the sol-gel before adding the photoinitiator) is added, and the sol-gel composition with the photoinitiator is stirred. The amount of the photoinitiator may be about 0.5, 1, 1.5, 2, 2.5, or 3 parts by weight per 100 parts of the sol-gel composition, where any value may form an upper end point or a lower end point, as appropriate. The stirring may be performed for a time period ranging from about 10 to about 60 min. The stirring may be performed for a time period of about 10, 20, 30, 40, 50, or 60 min, where any value may form an upper end point or a lower end point, as appropriate. Once the photoinitiator is added, exposure of the sol-gel composition to light may be avoided by covering a container for the sol-gel composition (e.g., using aluminum foil) and/or storing in an amber-colored container.

Example 1

Composition A was synthesized by mixing 171.5 g of 3-methacryloxypropyltrimethoxysilane and 17.0 g of water in a glass jar loaded on a magnetic stirrer. 5.5 grams of 0.1 N HCl was further added to the mixture. The solution was stirred in an ice bath till the solution turned transparent. Although 3-methacryloxypropyltrimethoxysilane was used in this example, one or more other alkoxysilanes of Formula I may be used in place of, or in addition to, 3-methacryloxypropyltrimethoxysilane in other examples. Also, although HCl was used in this example, one or more other inorganic acids may be used in place of, or in addition to, HCl in other examples.

Composition B was synthesized by mixing 11.8 g of methacrylic acid and 45.2 g of zirconium n-propoxide under vigorous stirring. Stirring was continued for about 2 h. Although zirconium n-propoxide was used in this example, one or more other zirconium alkoxides of Formula II may be used in place of, or in addition to, zirconium n-propoxide in other examples.

Composition B was added to Composition A under vigorous stirring to avoid agglomeration by placing the mixture in an ice bath, and the mixture was stirred for about 1 h. The jar containing the mixture was removed from the ice bath and stirred at room temperature for at least 1 h for the mixture to come to room temperature.

Then 100 g of phenyltrimethoxysilane was added to the mixture of Composition A and Composition B and stirred for about 1 h, and then 100 g of 3-aminopropyltrimethoxysilane was added and stirred for about 1 h. After completion of the 1 h of stirring with 3-aminopropyltrimethoxysilane, 25 grams of 3-glycidoxypropyltrimethoxysilane was added. Finally, 10 grams of methacrylic acid was added followed by 4 g of 0.1 N HCl and stirred for a further duration of 1 h. Although phenyltrimethoxysilane, 3-aminopropyltrimethoxysilane, and 3-glycidoxypropyltrimethoxysilane were used in this example, one or more other alkoxysilanes of Formula III may be used in place of, or in addition to, phenyltrimethoxysilane, 3-aminopropyltrimethoxysilane, and/or 3-glycidoxypropyltrimethoxysilane in other examples.

The resulting mixture was diluted with isopropanol in a weight ratio of about 1:1 and stirred for about 3 h at room temperature for aging. Although the mixture was stirred for about 3 h, the mixture may be aged for a different time period in other examples, such as by stirring overnight. Approximately 1 kg of sol-gel composition ready for coating application was formed. A photoinitiator, IRGACURE® 184, in the amount of about 2% by weight per 100% of the final sol-gel composition (including the photoinitiator) was added and stirred for 30 min. Although IRGACURE® 184 was used in this example, one or more other photoinitiators may be used in place of, or in addition to, IRGACURE® 184 in other examples. After adding IRGACURE® 184, the sol-gel composition was kept away from light to avoid the sol-gel composition from interacting with light.

Figure 2:
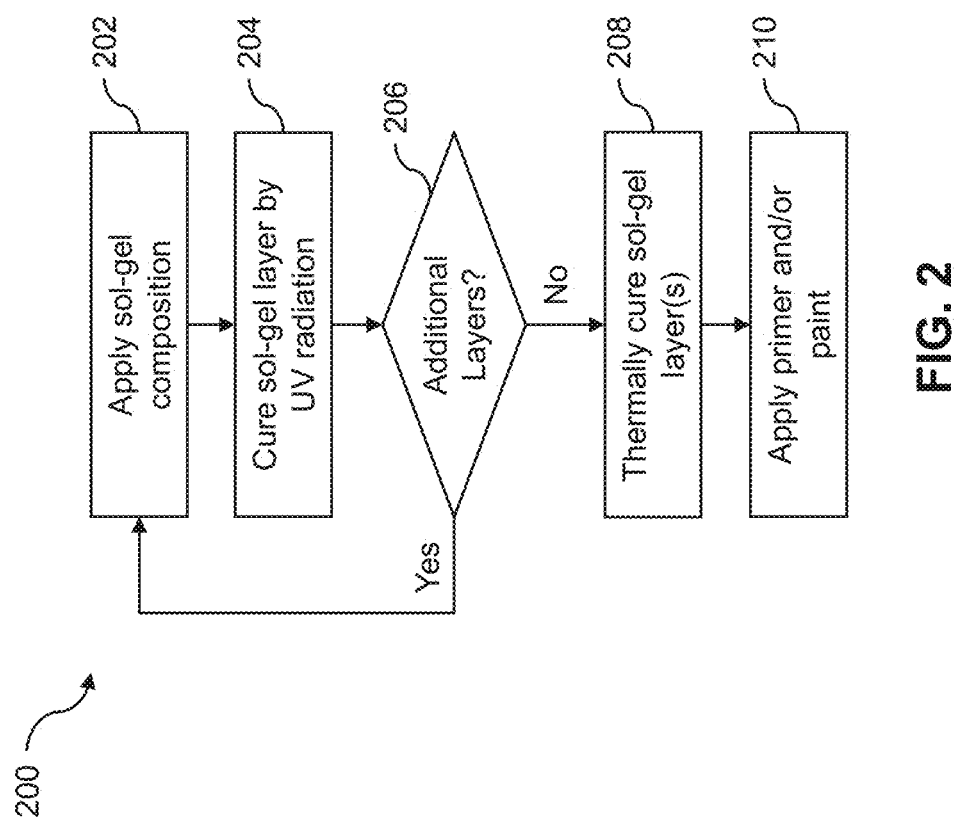
FIG. 2 illustrates an example process for forming a corrosion-resistant coating that includes one or more sol-gel layers in accordance with an embodiment of the present disclosure.

FIG. 2 illustrates an example process 200 for forming a corrosion-resistant coating that includes one or more sol-gel layers (e.g., one or more sol-gel coatings) on a substrate such as a panel (e.g., an aluminum substrate, an aluminum alloy substrate, or other substrate). One or more layers of the sol-gel composition are applied to a substrate, each of the one or more layers is cured by UV light, and then the one or more layers of the sol-gel composition are thermally cured.

At block 202, the sol-gel composition including the photoinitiator prepared by process 100 of FIG. 1 is applied to a substrate. The sol-gel composition is contacted with the substrate, for example, by dipping the substrate in the sol-gel composition, by immersing the substrate in the sol-gel composition, by spraying the sol-gel composition on the substrate, and/or by other methods of applying the sol-gel composition to the substrate. If dip coating is used, sol-gel layers can be deposited using a withdrawals speed ranging from about 1 to about 15 mm/s (e.g., about 5 to about 12 mm/s, about 10 mm/s, or other withdrawal speed). The withdrawal speed may be about 1, 2, 3, 4, 5, 6, 7, 8, 9, 10, 11, 12, 13, 14, or 15 mm/s, where any value may form an upper end point or a lower end point, as appropriate.

At block 204, the sol-gel layer formed by block 202 is cured by UV radiation. For example, the UV radiation has a light dose ranging from about 500 to about 1000 mJ/cm$^2$. The UV radiation may have a light dose of about 500, 550, 600, 650, 700, 750, 800, 850, 900, 950, or 1000 mJ/cm$^2$, where any value may form an upper end point or a lower end point, as appropriate. The curing by UV radiation may be performed for a time period ranging from about 0.5 to about 30 min. The time period may be about 0.5, 1, 2, 3, 4, 5, 10, 15, 20, 25, or 30 min, where any value may form an upper end point or a lower end point, as appropriate.

At block 206, if additional sol-gel layers are to be formed, blocks 202 and 204 are repeated. Blocks 202 and 204 may be repeated until the desired number of sol-gel layers is formed. Blocks 202 and 204 are performed for each of the sol-gel layer. In other embodiments, block 204 may be omitted for at least one of the sol-gel layers (e.g., at least one of the sol-gel layers may be air dried or thermally cured instead of curing using UV radiation). For example, curing using UV radiation may be omitted for the final, top-most sol-gel layer among the desired sol-gel layers.

At block 208, the sol-gel layers are thermally cured. For example, the one or more sol-gel layers are thermally cured at a temperature ranging from about 70 to about 90° C. The one or more sol-gel layers may be thermally cured at about 70, 75, 80, 85, or 90° C., where any value may form an upper end point or a lower end point, as appropriate. The thermal curing may be performed for a time period ranging from about 40 to about 120 minutes. The time period may be about 40, 50, 60, 70, 80, 90, 100, 110, or 120 min, where any value may form an upper end point or a lower end point, as appropriate. In an example, the thermal curing is performed in a hot air circulated oven. Alternatively, or in addition to, thermal curing at a high temperature, the thermal curing includes exposing the sol-gel layers to infrared (IR) radiation, near IR radiation, and/or microwave radiation. For example, the sol-gel layers are exposed to IR and/or near IR radiation for a time period ranging from about 10 to about 60 min (e.g., 30 min or other time period). The time period of exposure to IR and/or near IR may be about 10, 15, 20, 25, 30, 35, 40, 45, 50, 55, or 60 min, where any value may form an upper end point or a lower end point, as appropriate.

At block 210, primer and/or paint is applied on the sol-gel layer of the substrate. For example, the primer is applied on the top-most sol-gel layer, and the paint is applied on the primer. Advantageously, the cured sol-gel layers not only provide corrosion resistance to the substrate but also facilitate adherence of the primer and/or paint to the substrate.

Example 2

Each sol-gel layer of a substrate was UV cured using a conveyorized UV curing unit. UV curing was performed on both sides of the substrate using three-medium-pressure-mercury lamp conveyorized UV curing unit. The lamps provided an output of about 120 W/cm with a total wattage/lamp (1 m long)=12 kW. The belt speed was maintained at about 2 m/min during curing. The light dose as measured by a UV radiometer was 871 mJ/cm² in the UV-C region. After UV curing for about 5 minutes, the sol-gel layer coated substrate was subjected to thermal curing in an air circulated oven at 80° C. for 1 h.

Figure 3A:
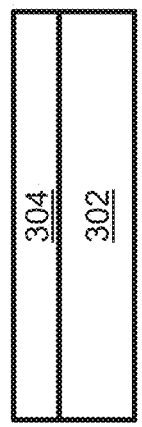
FIGS. 3A-C illustrate example corrosion-resistant coatings that include one or more sol-gel layers in accordance with embodiments of the present disclosure.
Figure 3B:
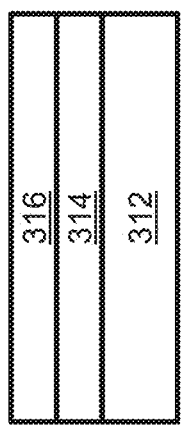
Figure 3C:
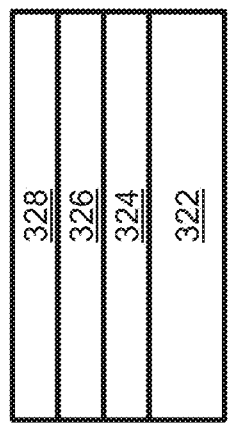

FIGS. 3A-C illustrate example corrosion-resistant coatings that include one or more sol-gel layers, which may be formed, for example, by process 200 of FIG. 2. FIG. 3A shows a substrate 302 with one sol-gel layer 304. A sol-gel composition is contacted with substrate 302 to provide sol-gel layer 304. Sol-gel layer 304 is UV cured, and then thermally cured.

FIG. 3B shows a substrate 312 with two sol-gel layers 314 and 316. Sol-gel layer 314 is formed on substrate 312, and sol-gel layer 316 is formed on sol-gel layer 314 of substrate 312. A sol-gel composition is contacted with substrate 312 to provide sol-gel layer 314 and sol-gel layer 314 is UV cured. Then, the sol-gel composition is contacted with sol-gel layer 314 to provide sol-gel layer 316 on sol-gel layer 314, and sol-gel layer 316 is UV cured. Sol-gel layer 316 is not UV cured in other examples. Then, sol-gel layers 314 and 316 are thermally cured.

FIG. 3C shows a substrate 322 with three sol-gel layers 324, 326, and 328. Sol-gel layer 324 is formed on substrate 322, sol-gel layer 326 is formed on sol-gel layer 324 of substrate 322, and sol-gel layer 328 is formed on sol-gel layer 326 of substrate 322. A sol-gel composition is contacted with substrate 322 to provide sol-gel layer 324 and sol-gel layer 324 is UV cured. Then, the sol-gel composition is contacted with sol-gel layer 324 to provide sol-gel layer 326 on sol-gel layer 324, and sol-gel layer 326 is UV cured. Then, the sol-gel composition is contacted with sol-gel layer 326 to provide sol-gel layer 328, and sol-gel layer 328 is UV cured. Sol-gel layer 328 is not UV cured in other examples. Then, sol-gel layers 324, 326, and 328 are thermally cured. Although multiple sol-gel layers including two layers (FIG. 3B) and three layers (FIG. 3C) are shown, multiple sol-gel layers may include more layers in other examples.

Figure 4:
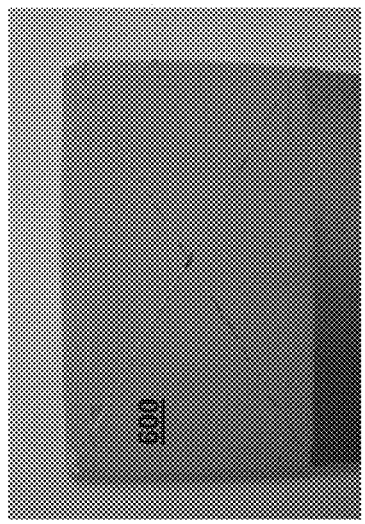
FIG. 4 is a scanning electron microscopy (SEM) image of a surface of a sol-gel layer coating a substrate.

FIG. 4 is a scanning electron microscopy (SEM) image of a surface 400 of a sol-gel layer coating a substrate. Sol-gel layer surface 400 is amorphous and no features are present except agglomerates of silica particles.

Figure 5A:
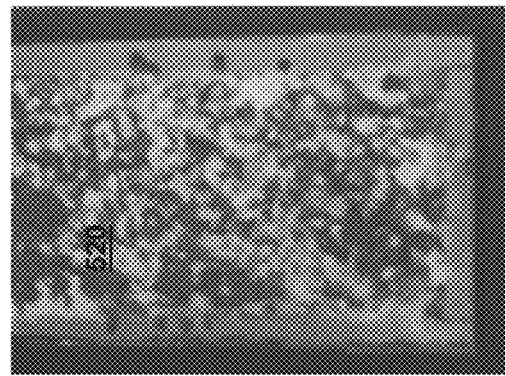
FIG. 5A is an image of a sol-gel coated substrate formed by the process of FIG. 2 after a corrosion-resistance test.

FIG. 5A is an image of a sol-gel coated substrate 500, formed by the process of FIG. 2, after a corrosion-resistance test. Sol-gel coated substrate 500 with two sol-gel layers was exposed to a 5% salt spray. Sol-gel coated substrate 500 was able to withstand more than 168 h of salt spray. FIG. 5A shows sol-gel coated substrate 500 after 336 h of the salt spray test.

Figure 5B:
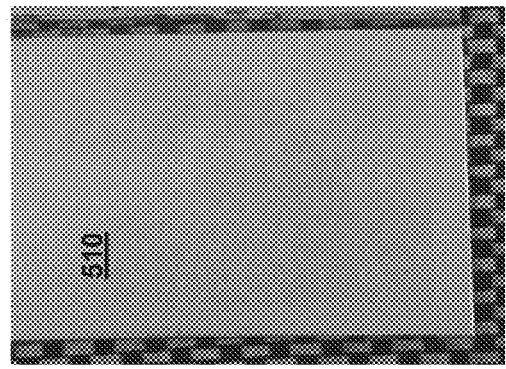
FIG. 5B is an image of a hexavalent chrome conversion coated substrate after a corrosion-resistance test.

FIG. 5B is an image of a hexavalent chrome conversion coated substrate 510, formed by conversion coating, after a corrosion-resistance test. Chromated substrate 510 was exposed to a 5% salt spray. FIG. 5B shows chrome conversion coated substrate 510 after 336 h of the salt spray test. Chrome conversion coating followed by applying a primer and paint is currently considered the state of the art for corrosion-resistant coatings for metal or metal alloy substrates. Advantageously, sol-gel coated substrate 500 shown in FIG. 5A has a corrosion resistance comparable to or better than that of hexavalent chrome conversion coated substrate 510.

Figure 5C:
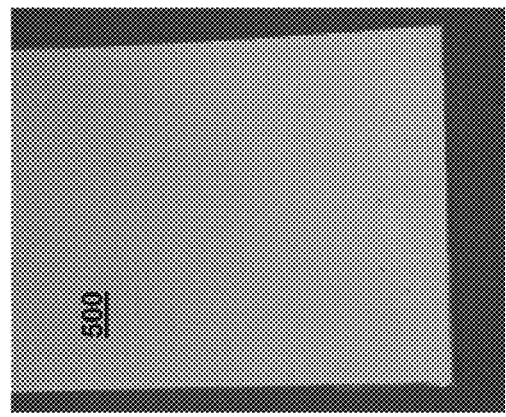
FIG. 5C is an image of an uncoated substrate after a corrosion-resistance test.

FIG. 5C is an image of an uncoated aluminum alloy substrate 520 after a corrosion-resistance test. Uncoated substrate 520 was exposed to a 5% salt spray. FIG. 5C shows uncoated substrate 520 after 336 h of the salt spray test, which was severely corroded.

Figure 6:
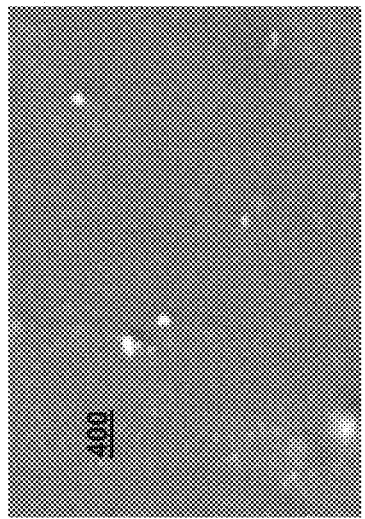
FIG. 6 is an image of a primer applied sol-gel coated substrate formed by the process of FIG. 2 after an adhesion test.

FIG. 6 is an image of a primer applied sol-gel coated substrate 600 formed by process 200 of FIG. 2 after an adhesion test. A scribed wet tape adhesion test on primer applied sol-gel coated substrate 600 was performed as follows. Primer applied sol-gel coated substrate 600 was immersed in tap water for 24 h. After 24 h, primer applied sol-gel coated substrate 600 was removed and blot dry with cheesecloth. Using a metal cutting tool (e.g., a razor blade, a scalpel, a knife, or other cutting tool), two parallel 2 inch long scratches were made, ¾ to 1 inch apart, through the coating and to the substrate. The parallel scratches were joined with two intersecting lines, or an "X" pattern. An adhesive tape was applied over the scratched pattern, and the tape was pressed against the test surface with firm hand pressure. (Alternatively, adhesive tape may be applied using a roller). One end of the tape was lifted such that a length of about 2 inches on that end of the tape was not in contact with the test surface. The minimum remaining length of the tape in contact with the test area was approximately 4 inches. The lifted-up 2 inch segment of the tape was positioned to create an approximate 45 degree angle with the test surface. The remainder of the tape was removed by pulling up and back with an abrupt motion. For this adhesion test, if the primer comes off the substrate, it implies poor adhesion. If the primer does not come off the substrate, it implies good adhesion. As shown by the result in FIG. 6, the primer of sol-gel coated substrate 600 did not come off. Thus, the sol-gel layers formed by process 200 of FIG. 2 advantageously have good adhesion to organic paint such as primer and/or paint.

All mentioned documents are incorporated by reference as if herein written. When introducing elements of the present invention or exemplary aspects or embodiment(s) thereof, the articles "a," "an," "the," and "said" are intended to mean that there are one or more of the elements. The terms "comprising," "including," and "having" are intended to be inclusive and mean that there may be additional elements other than the listed elements. Although this invention has been described with respect to specific embodiments, the details of these embodiments are not to be construed as limitations. Different aspects, embodiments and features are defined in detail herein. Each aspect, embodiment or feature so defined may be combined with any other aspect(s), embodiment(s) or feature(s) (preferred, advantageous or otherwise) unless clearly indicated to the contrary. Accordingly, the scope of the invention is defined only by the following claims.

What is claimed is:

1. A method comprising:
   contacting a first alkoxysilane with water and an inorganic acid to form a first composition;
   contacting a zirconium alkoxide with a first organic acid to form a second composition;
   contacting the first composition with the second composition to form a mixture;
   contacting a phenyl alkoxysilane, an aminopropyl alkoxysilane, a glycidoxypropyl alkoxysilane, and a second organic acid with the mixture to form a sol-gel composition, the sol-gel composition having a ratio of a number of moles of silicon to a number of moles of zirconium ($n_{Si}/n_{Zr}$) ranging from about 2 to about 10;
   aging the sol-gel composition by adding only an organic solvent and stirring for about 1 hour to about 24 hours; and
   adding a photoinitiator to the sol-gel composition.

2. The method of claim 1, wherein the contacting to form the first composition comprises mixing the first alkoxysilane having the formula $R_A$—Si—$(R_B)_3$ with the water and the inorganic acid, wherein the $R_A$ is methacryloxyalkyl or glycidyloxyalkyl, and wherein the $R_B$ is methoxy or ethoxy.

3. The method of claim 2, wherein the mixing comprises:
   adding the water to a methacryloxypropyl alkoxysilane, the ratio of a number of moles of silicon to a number of moles of water ($n_{Si}/n_{water}$) ranging from about 0.5 to about 2; and
   adding the inorganic acid and stirring.

4. The method of claim 1, wherein the contacting to form the second composition comprises mixing the zirconium alkoxide having the formula Zr—$(R_C)_4$ with methacrylic acid (MAA), and wherein the $R_C$ is ethoxy, n-propoxy, isopropoxy, n-butyloxy, or tert-butyloxy.

5. The method of claim 4, wherein the mixing comprises adding MAA to zirconium n-propoxide and stirring, the ratio of a number of moles of zirconium to a number of moles of MAA ($n_{Zr}/n_{MAA}$) ranging from about 0.5 to about 2.

6. The method of claim 1, wherein the contacting to from the sol-gel composition comprises:
   adding the phenyl alkoxysilane, the aminopropyl alkoxysilane, and the glycidoxypropyl alkoxysilane; and
   adding MAA and stirring.

7. The method of claim 1, wherein the adding the photoinitiator comprises adding the photoinitiator in an amount ranging from about 0.5 to about 3 parts by weight per 100 parts by weight of the sol-gel composition.

8. The sol-gel composition prepared by the method of claim 1.

9. The method of claim 1, further comprising:
   applying the sol-gel composition on a substrate a plurality of times to form a plurality of sol-gel layers;
   curing at least one of the plurality of sol-gel layers by UV radiation; and
   thermally curing the plurality of sol-gel layers to form a corrosion-resistant coating comprising the plurality of sol-gel layers.

10. The method of claim 9, wherein the curing the at least one of the plurality of sol-gel layers by the UV radiation comprises exposing the at least one of the plurality of sol-gel layers to the UV radiation having a light dose ranging from about 500 to about 1000 mJ/cm² for a time period ranging from about 0.5 to about 30 min.

11. The method of claim 9, wherein the thermally curing the plurality of sol-gel layers comprises curing the plurality of sol-gel layers at a temperature ranging from about 70 to about 90° C. for a time period ranging from about 40 to about 120 minutes in a hot air circulated oven.

12. The method of claim 9, wherein the thermally curing the plurality of sol-gel layers comprises exposing the plurality of sol-gel layers to infrared (IR) radiation, near IR radiation, microwave radiation, or a combination thereof.

13. The method of claim 9, further comprising applying primer and/or paint on the plurality of sol-gel layers on the substrate, the plurality of sol-gel layers facilitating adherence of the primer or the paint to the substrate, wherein the substrate comprises an aluminum alloy substrate selected from the group comprising 2024 aluminum alloy, 6061 aluminum alloy, and 7075 aluminum alloy.

14. The corrosion-resistant coating formed by the method of claim 9.

15. The method of claim 1, further comprising:
   contacting the sol-gel composition with a substrate to form a first layer of the sol-gel composition on the substrate;
   exposing the first layer to UV radiation;
   contacting the sol-gel composition with the first layer to form a second layer of the sol-gel composition on the first layer;
   exposing the second layer to the UV radiation; and
   thermally curing the first layer and the second layer to form a corrosion-resistant coating comprising the first layer and the second layer.

16. The method of claim 15, further comprising:
   contacting the sol-gel composition with the second layer to form a third layer of the sol-gel composition on the second layer; and
   exposing the third layer to the UV radiation;
   wherein the corrosion-resistant coating further comprise the third layer.

17. A corrosion-resistant coated product, comprising:
   a plurality of ultraviolet (UV)-cured sol-gel layers on a substrate, each of the UV-cured sol-gel layers comprising a photoinitiator and a polymer composite of a methacryloxyalkyl alkoxysilane, an aryl alkoxysilane, an aminoalkyl alkoxysilane, a glycidoxyalkyl alkoxysilane, a zirconium alkoxide, and an organic acid, and each of the UV-cured sol-gel layers having a ratio of a number of moles of silicon to a number of moles of zirconium ($n_{Si}/n_{Zr}$) ranging from about 2 to about 10.

18. The corrosion-resistant coated product of claim 17, wherein the organic acid comprises methacrylic acid (MAA).

19. A method comprising:
contacting a first alkoxysilane with water and an inorganic acid to form a first composition;
contacting a zirconium alkoxide with a first organic acid to form a second composition;
contacting the first composition with the second composition to form a mixture;
adding a phenyl alkoxysilane, an aminopropyl alkoxysilane, a glycidoxypropyl alkoxysilane, and a second organic acid with the mixture to form a sol-gel composition, the sol-gel composition having a ratio of a number of moles of silicon to a number of moles of zirconium ($n_{Si}/n_{Zr}$) ranging from about 2 to about 10; and
adding a photoinitiator to the sol-gel composition.

* * * * *